United States Patent [19]

Olson

[11] Patent Number: 5,245,616
[45] Date of Patent: Sep. 14, 1993

[54] TECHNIQUE FOR ACKNOWLEDGING PACKETS

[75] Inventor: Gene H. Olson, Minneapolis, Minn.

[73] Assignee: Rosemount Inc., Eden Prairie, Minn.

[21] Appl. No.: 888,456

[22] Filed: May 20, 1992

Related U.S. Application Data

[63] Continuation of Ser. No. 702,453, May 6, 1991, abandoned, which is a continuation of Ser. No. 315,395, Feb. 24, 1989, abandoned.

[51] Int. Cl.$^5$ .............................................. H04L 1/16
[52] U.S. Cl. .......................................... 371/32; 370/60
[58] Field of Search ........................ 371/32, 33, 34, 35; 370/60

[56] References Cited

U.S. PATENT DOCUMENTS

| | | | |
|---|---|---|---|
| 4,422,171 | 12/1983 | Wortley et al. | 371/32 |
| 4,439,859 | 3/1984 | Donnan | 371/32 |
| 4,617,657 | 10/1986 | Drynan et al. | 370/60 |
| 4,797,881 | 1/1989 | Ben-Artzi | 370/88 |
| 4,805,169 | 2/1989 | Van Asselt | 370/85 |
| 4,841,526 | 6/1989 | Wilson et al. | 371/32 |

FOREIGN PATENT DOCUMENTS

| | | |
|---|---|---|
| 0162478 | 11/1985 | European Pat. Off. . |
| 0186343A2 | 7/1986 | European Pat. Off. . |
| 0229353A2 | 7/1987 | European Pat. Off. . |
| 2206020A | 12/1988 | United Kingdom . |
| 2180127B | 8/1989 | United Kingdom . |

OTHER PUBLICATIONS

"Deadlock Avoidance In Store and Forward Networks—I: Store and Forward Deadlock", Philip M. Merlin and Paul J. Schweitzer, *IEEE Transactions on Communications*, vol. Com-28, No. 3, Mar. 1980, pp. 345-353.

Tanenbaum, A., *Computer Networks*, 2nd ed., Prentice-Hall, 1988, pp. 212-239.

Brodd, W., "HDLC ADCCP, and SDLC: What's the Difference?", *Data Communications*, Aug. 1983.

*Primary Examiner*—Stephen M. Baker
*Attorney, Agent, or Firm*—Kinney & Lange

[57] ABSTRACT

A plurality of message packets are individually acknowledged in a communications network. The acknowledgement includes multiple types of status information including ACK, NAK and BUSY. Each message packet is assigned a sequence number. Acknowledgements are sent in response to receiving a message packet and include status information for the last message packet received along with status information for the seven message packets previously received. If after a timeout period expires and no message packets have been received, a status inquiry message is transmitted.

21 Claims, 3 Drawing Sheets

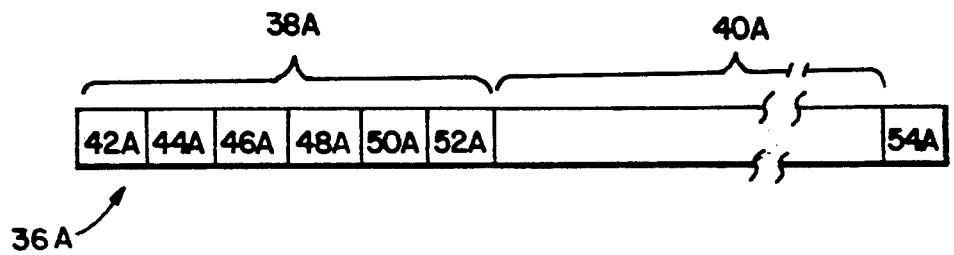
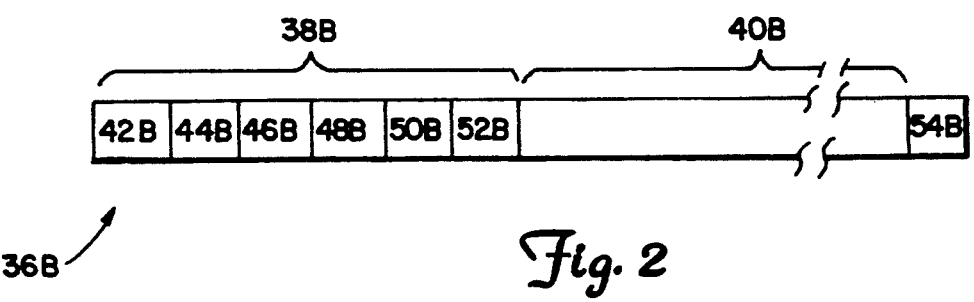
Fig. 2
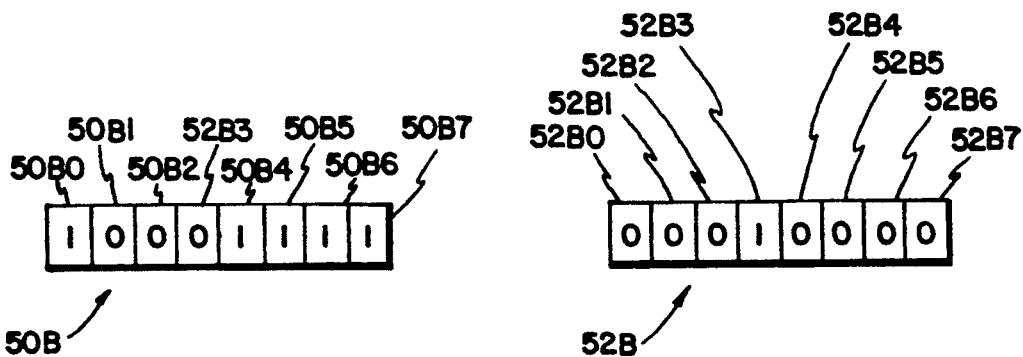
Fig. 3
Fig. 4

TECHNIQUE FOR ACKNOWLEDGING PACKETS

This is a continuation of application Ser. No. 07/702,453 filed on May 16, 1991 abandoned as of the date of this application which is a continuation of application Ser. No. 07/315,395 filed Feb. 24, 1989 abandoned as of May 16, 1991.

BACKGROUND OF THE INVENTION

1. Field of the Invention

This invention relates to a unit sending data packets to another unit through a communication medium or a link coupled between the units, and acknowledgement of data packets by the receiving unit.

2. Description of the Prior Art

Various techniques for acknowledging message packets in a communication system have been used, including ACK/NAK and sequencing protocols.

With the ACK/NAK protocol, a transmitting unit transmits a data packet to a receiving unit. If a receiving unit receives the packet, the receiving unit acknowledges receipt of the packet by transmitting back either an "ACK" acknowledgment signal indicating that the packet is correctly received, or a "NAK" no acknowledge signal indicating that the message is received, but not used. The NAK signal can indicate that there is an error in the received data or that the receiving unit is busy and cannot accept or use the data until a later time. If a NAK is received, the transmitting unit can automatically retransmit the data packet. The ACK or NAK signal is returned after each packet is sent, and before the next packet is sent. If the transmitting unit does not receive the expected ACK or NAK, from the receiving unit during an interval of time (called a time out interval) after transmission, the transmitting unit retransmits the same data packet. If an ACK signal is lost or garbled in transmission back to the transmitting unit, the transmitting unit will wait for the time out interval to elapse and then retransmit the data packet, even though the data packet was correctly received and used. If the communication medium is noisy or unreliable, time is wasted waiting for time outs and retransmitting data which has already been transmitted correctly, reducing the throughput of data, or performance for the communication system.

With the sequencing protocol, however, an acknowledgement is not necessarily sent after every packet; an acknowledgement may be sent after a group of packets is sent. The number of packets in the group can be selected based upon the reliability of the medium and transit or propagation time delays waiting for an acknowledgement to come back via the medium. When the medium conveys data reliably, the sequencing protocol can achieve higher data rates than the ACK/NAK protocol because less time is used by the receiver sending acknowledgements and by the transmitter waiting for acknowledgements.

With the sequencing protocol, counters in the transmitting and receiving units are synchronized at the start of the transmission of a group of packets. The transmitting unit's counter is incremented each time a packet is sent. The packet includes data indicating the count of the transmitting unit's counter. The receiving unit's counter is incremented only if a packet is received correctly and in proper sequence as indicated by the count. Thus, if one packet is not received correctly, all the following packets are ignored even if they are correctly received. After a packet, or a series of packets have been correctly received, the count of the receive counter is sent back to the transmitting unit as an acknowledgement signal to be compared to the count of the transmit counter. If no response is received by the transmitting unit after an interval of time (a time out interval), the transmitting unit begins retransmitting packets beginning with the first packet for which no acknowledgment was received. Then, all of the packets sent after that first lost packet must be retransmitted, even though many of them may have been accurately received already. The retransmission process is repeated until all of the packets in the group are received, as indicated when the transmit counter equals the last received receive counter.

In communication systems using a communication medium that is not near 100% reliable, both the ACK-NAK and the sequencing protocol suffer severe increases in the time required to send a series of message packets. With the ACK-NAK protocol, time is consumed by unnecessary time-outs and duplicate transmissions. With the sequencing protocol, time is consumed by unnecessary transmission of duplicate packets.

Thus a communication protocol is desired that transmits packets without waiting for an acknowledgment after each packet is sent from the receiving node and also with reduced transmission of unneeded duplicate message packets.

SUMMARY OF THE INVENTION

In the present invention, a transmitting unit sends a group of data packets to a receiving unit. The receiving unit responds by transmitting an acknowledgement output back to the transmitting unit, acknowledging whether the last received data packet and also a selected number of preceding packets sent to the receiving unit from the transmitting unit each have been received correctly. Responding to the acknowledgement, the transmitting unit selectively retransmits those data packets indicated to be not correctly received. A system comprises two or more of the units, also called nodes, linking together communication networks, such as in a process control system.

In such a system, an acknowledgement of a first packet sometimes fails to get back to the transmitting unit due to noise, a collision on the bus, or other causes, even though the first packet was received and used by the receiving unit. With the present invention, the transmitting unit transmits subsequent packets, without waiting a long "time out" interval, even though it failed to receive an acknowledgement of the first packet. After a subsequent data packet is transmitted, a subsequent acknowledgement signal is received back, and the subsequent acknowledgement signal contains data which replaces the lost acknowledgement of the first packet. The transmitting unit then responds in a way which makes good use of the time available on the bus. If the first packet was received correctly, it does not make a wasteful retransmission of the packet. If the first packet was not received correctly, or not received at all, the transmitting unit retransmits the lost packet. The transmitting unit can retransmit only the packet or packets which are lost. It does not need to retransmit a whole group of packets when only one packet is lost. Retransmission of data packets is thus selectively limitable to only those data packets which have been lost.

When each packet is sent, the data in each packet includes a word of redundant data calculated from the raw data desired to be transmitted. This redundant information usually takes the form of check digits or checksums. When each packet of data is received, the receiving unit calculates the redundant data independently and compares it to the transmitted redundant data to verify correct transmission. The receiving unit stores the result of this comparison, called "status", for each packet to be sent back as part of an acknowledgement.

Each node comprises a number of transmit counters. Each transmit counter is associated with a corresponding node in the system to which the transmitting node transmits packets. Each transmit counter in a transmitting unit generates a sequence number output which is incremented each time a packet is sent to the node associated with that counter. Each packet includes a layer of data indicating the sequence number or count of the counter. The receiving unit stores the sequence number associated with each data packet along with the status for that data packet in a memory or buffer. When a node sends back an acknowledgement, the acknowledgement includes data indicating the status for the last packet received, and also the status associated with a selected number of preceding sequence numbers. If a previously transmitted packet was not received, the status indicates that, as well. Multiple classes of status may be indicated for each packet. For example, three different classes of status for each packet may be, but is not limited to: received and accepted (ACK), received but not accepted (BUSY) or not received (NAK).

In a preferred embodiment, for example, the acknowledgement contains status information for the last eight packets. This is chosen based upon the user's evaluation of the characteristics of the transmission medium, such as reliability and propagation delay, and the user's tolerance for transmission errors. In this example, a transmitting node designated "node A" sends packets of data to a receiving node designated "node B". Node A comprises a modulo counter associated with the sequence number contained in messages transmitted to Node B which counts repetitively from 0 to 255. After each transmission of a packet from node A to node B, node B responds by transmitting back an acknowledgement to node A which includes the current counter number, the status of the last packet received from node A and the status of the seven packets with preceding counter numbers previously expected from node A. Thus unless eight consecutive acknowledgements from node B are lost, node A will always be informed of which packets in the transmitted sequence were received correctly by node B, which packets were received incorrectly or not received at all and which packets were received while node B was busy. Node A then renumbers those packets that were not properly received by node B and places them at the end of the sequence where they are retransmitted with new sequence numbers to node B. This process continues until the complete sequence is correctly received by node B. Additionally, at any time node A can interrogate node B concerning the status of the last eight messages received by node B.

It is also possible to piggyback or add this status information on packets being transmitted from node B to node A. Thus when there is a sequence of messages being exchanged both from node A to node B and also from node B to node A, status information concerning the most recently received packet along with the seven previously received packets is exchanged between the two nodes with very little overhead on the communication medium.

Using this new protocol, message packets are exchanged at increased speed while eliminating transmission of duplicate messages. Furthermore, the more unreliable the communication medium is in the communication system, the greater the benefits are of using this new communications protocol over the other communication protocols. The protocol is especially useful in a process control system which does not require that packets of information be received in a particular sequence or order. The protocol is also especially useful in a process control system in which it is desired to avoid the receiving of duplicates packets, such as packets including instructions to increment or decrement a counter.

BRIEF DESCRIPTION OF THE DRAWINGS

FIG. 2 shows data from a message packet and an acknowledgement transmitted on the communication system of FIG. 1.

FIG. 3 shows a section of the status field used in the message packet of FIG. 2.

FIG. 4 shows a section of the status field used in the message packet of FIG. 2.

DETAILED DESCRIPTION OF THE PREFERRED EMBODIMENTS

Figure 1:
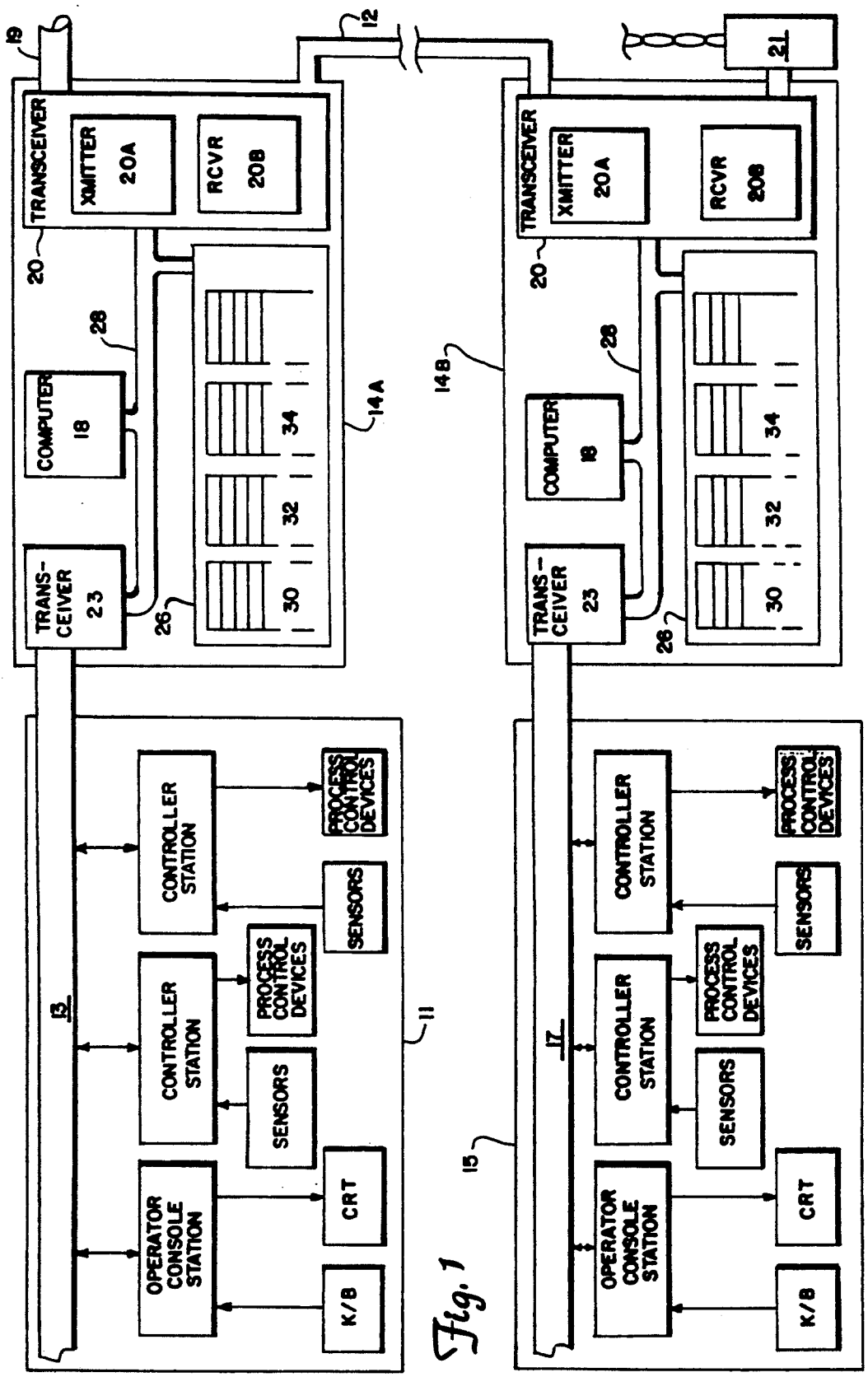
FIG. 1 shows two nodes linking data between two process control systems in accordance with the present invention.

In FIG. 1, a first process control system 11 comprises an operator console station, and controller stations coupled together by a communication bus 13 for sensing process parameters with sensors and controlling process parameters with process control devices. A second process control system 15, which can be similar to system 11, is interconnected with a second communication bus 17. The control systems 11 and 15 perform control functions on the same process, or on interrelated processes. Automatic transfer of packets of data or information between communication busses 11 and 15 and other systems is desired to improve control of the processes. Various forms of communication links such as coaxial cable 19, telephone modem link 21, and data bus 12, are available for transferring data packets between the busses 13 and 17 and the busses of other systems. The communication links, however, are sometimes less than completely reliable and an interface device is desired between the control system busses and the data links which automatically corrects errors which occur in transmission.

In FIG. 1, packets of data are transferred from bus 13 through an interface unit or node 14A, then along bus 12 to interface unit or node 14B, and finally to bus 17. Packets of data are transferred also from bus 17 through the interface unit 14B, then along bus 12 to interface unit 14A and finally to bus 13. Interface unit 14B is similar in design to interface device 14A, and the description below of the internal arrangement of interface device 14A with respect to control system 11 applies to interface device 14B with respect to control system 15, as well.

Interface unit 14A comprises a computer 18 performing calculation and control functions which couples data along a bus 28 internal to the interface unit 14A.

The internal bus 28 can accommodate bi-directional data transfers. A transceiver 23 in interface unit 14A couples data packets back and forth between the control system bus 13 and the internal bus 28. A transceiver 20 in interface unit 14A couples data packets back and forth between the internal bus 28 and the data link 12. The transceiver 20 also couples data packets between the internal bus 28 and another similar interface unit 14C (shown in FIG. 5) along coaxial cable 19. The transceiver 20 in interface unit 14B, however, connects to a telephone modem link 21 rather than a coaxial cable link. The transceiver 20 in interface unit 14A includes a transmitter 20A for transmitting data packets to links 12 and 19 and a receiver 20B for receiving data packets from links 12 and 19. A memory 26 connects to computer 18 through bus 28. Memory 26 includes a portion for receive counters 30, transmit counters 32 and status words 34. Computer 18 controls transfer of data internal to the interface unit 14A to accomplish transfer of packets between busses 12 and 13, and performs acknowledgement and message correction functions according to the invention.

The message packets transmitted over links 12, 19, 21 can take a variety of forms. Various known methods of modulation, layering of control words, preambles, delimiters, serial or parallel formats, and the like, can be implemented into the message packets to make them compatible with the type of link or physical layer of communication which has been selected for use. Two message packets are shown schematically in FIG. 2. Packet 36A represents a packet sent from interface unit 14A to interface unit 14B in FIG. 1. Packet 36B represents packets sent from interface unit 36B to interface unit 14A in FIG. 1. Packets 36A and 36B have a number of different fields, including protocol sections 38A and 38B followed by message data fields 40A and 40B, respectively. Protocol section 38A and 38B include bit count fields 42A and 42B indicating the total number of bits in packets 36A and 36B, respectively. Protocol sections 38A and 38B also comprise transmit sequence fields 44A and 44B indicating the sequence of the data in message data fields 40A and 40B (e.g. 0–255), respectively, receive sequence fields 46A and 46B indicating the sequence number of the last message received (e.g. 0–255), status inquiry bits 48A and 48B, acknowledgment (ACK) fields 50A and 50B and BUSY fields 52A and 52B, respectively. Message packets 36A and 36B also include a field of redundant data 54A and 54B, respectively, such as a check sum calculated by the sending unit from message data 40A or 40B. Message data 40A or 40B is usually a large number of bytes, for example, 128 bytes and can include additional redundant data such as check digits.

After packet 36A is sent by interface unit 14A to interface unit 14B, packet 36B shown in FIG. 2 is sent back as an acknowledgement. Packet 36B includes bit count field 42B indicating the length of the message data 40B. Packet 36B includes receive sequence field 46B indicating the sequential message number of the packet being acknowledged. ACK field 50B and BUSY field 52B indicate respectively whether each of the last 8 packets have been received and whether the interface unit 14B was busy when the packet was received. Fields 50B, 52B together indicate status of packets previously sent to interface unit 14A on link 12 in FIG. 1.

FIG. 3 shows a detailed view of ACK field 50B. Acknowledgment field 50B comprises acknowledgment bits 50B0 through 50B7 indicating whether each of the last eight packets has been received. BUSY field 52B shown in FIG. 4 comprises busy bits 52B0 through 52B7 indicating whether interface unit 14B was busy when each of the last eight packets of data was received.

In operation, nodes 14A and 14B shown in FIG. 1 are in communication with each other using communication link 12. Message packets such as 36A and 36B are transmitted on communication link 12 bi-directionally between node 14A and node 14B. A protocol section, 38A or 38B, for example, acknowledging a first packet of data going in a first direction on link 12 can include data in the data field, 40A or 40B, going back in an opposite direction on link 12 to the unit which transmitted the first packet of data. For example, assume node 14A is transmitting a sequence of message packets similar to packet 36A to node 14B. The message number in the transmit sequence field 44A in protocol section 38A of each message packet 36A sent from node 14A to node 14B will contain that message packet's sequential message number. These message numbers may be in the range from zero to 255. The sequence repeats once the message number in the transmit sequence field 44 reaches 255. Referring to FIG. 1, node 14A receives input data on the input data bus 13. This input data is passed and moved to the message data field 40A by computer 18. Computer 18 forms the message packet 36A by adding protocol section 38A to message data field 40A. The computer 18 in node 14A also adds acknowledgements for other packets to the ACK field 50A and BUSY field 52A in protocol section 36A. The message number in transmit sequence field 44A in protocol section 38A is recalled from transmit counters 32 of memory array 26 in node 14A. The receive number in receive sequence field 46A in protocol section 38A is recalled from receive counters 30 of memory array 26 in node 14A. Computer 18 of node 14A recalls information for acknowledgment field 50A and BUSY field 52A from the memory 34 as explained below. Status inquiry bit 48A is added by computer 18 as explained below. After forming message packet 36A, computer 18 passes message packet 36A to transceiver 20 along internal bus 28. Transceiver 20 formats this message packet for transmission along communication link 12.

As node 14A sends a sequence of message packets 36A, they are received at node 14B. In response to each message packet 36A received from node 14A, node 14B forms a packet 36B for transmission back to node 14A. For example, after a message is received by node 14B from node 14A, node 14B would transmit a packet 36B having message number fields corresponding to those in the packets being acknowledged.

Referring to FIG. 3, the individual bits 50B0–50B7 that comprise the data in ACK field 50B are shown. For example, the "1" in ACK bit 50B0 indicates that the last message from node 14A was properly received. The "0" in acknowledgment bit 50B1 indicates that the second to the last message received by node 14B from node 14A either not received or improperly received as indicated by comparing the checksum data in 54A with the checksum as calculated by node 14B. This code continues for acknowledgment bits 50B2 through 50B7. Thus each acknowledgment bit 50B0 through 50B7 represents an offset message number such that the actual message number is referenced from a base value stored in receive sequence field 46B indicating the message number of the last message received by node 14B from node 14A. For example when receive sequence field 46B contains "22", acknowledgment bit 50B0 represents message "22", acknowledgment bit 50B1 represents message "21", acknowledgment bit 50B2 represents message "20", and so forth.

The BUSY field 52B carries the busy status of the last eight messages received by node 14B from node 14A. For example, when the busy field 52 for node B contains the number "16" (binary 0001 0000), busy bit 52B3 shown in FIG. 4 carries a "1" while busy bits 52B0–52B2 and 52B3–52B7 carry "0". This indicates that node 14B was busy when the fourth to the last message was received. This may have occurred because the buffers at node 14B were full or because node 14B was for some other reason unable to accept the message. Similar to ACK field 50B, each busy bit 52B0 through 52B7 in the BUSY field 52 represents an offset value from a base message value contained in receive sequence field 46B. For example, when receive sequence field 46B carries the number "22", busy bit 52B0 represents the busy status of message number "22" received by node 14B from node 14A, busy bit 52B1 corresponds to message "21", busy bit 52B2 corresponds to message "20", and so forth.

When node 14A receives packet 36B, node 14A will calculate that messages "19" through "21" were not acknowledged and when message "19" was received by node 14B, node 14B was busy. Node 14A would then place messages "19" through "21" on the top of the stack of messages in line for transmission to node 14B. Messages "19" through "21" would be correspondingly renumbered in the sequence prior to transmission to node 14B.

In severe conditions, eight consecutive messages could be lost in transmission from node 14A to node 14B while node 14B had either not transmitted any message packets 36B to node 14A or those message packets had also been lost in transmission. In this situation, node 14A can send a message packet with status inquiry bit (SIB) in field 48A of protocol section 38A set to "1". When node 14B receives message packet 36A with SIB 48A set to "1", if that packet 36A contains no data in message data field 40A as indicated by the contents of bit count field 42A node 14B responds immediately with a message packet 36B including its current protocol section 38B without updating the receive number stored in memory 30 of node 14B. Node 14A continues transmitting message packets 36A with status inquiry bit in data field 48A set to "1" until node 14A receives a response from node 14B. Thus the system will default to a time-out type protocol only after eight consecutive message packets 36A are lost in transmission to node 14B.

Figure 5:
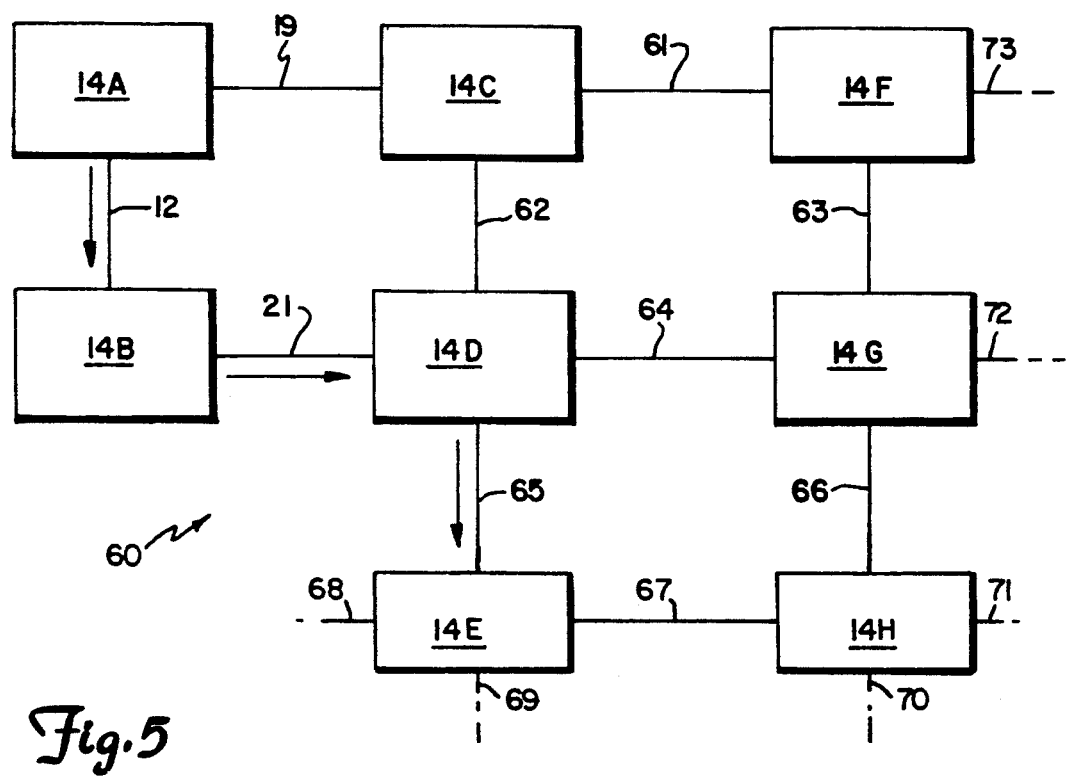
FIG. 5 shows a portion of a communication system having nodes with multiple communication links.

FIG. 5 shows a diagram of a complex communication network 60 having numerous nodes 14A through 14H interconnected by links 12, 19, 21, and 61–73. The nodes in the network have can pass packets between their associated process control systems (not shown) and the connected links, and further from one connected link to another connected link so that messages can be passed from node to node. Such communication networks often have a number of different "levels" responsible for transporting the message from node to node. For example, the communication network may have a high level concerned only with overall network configuration and addressing. There may be an intermediary level or transport level concerned with intermediary communication functions such as the path a message is intended to follow between two nodes. For example, arrows in FIG. 5 indicate one possible path for message packets between nodes 14A and 14H. Finally there may be a low level or link level concerned only with transmitting a message over a single communication link such as link 12. Thus, it is the link level that carries out the functions associated with transmitting a message between node 14A and node 14B, node 14B and 14D, node 14D and 14E, and node 14E and 14H using the path indicated by the arrows between nodes 14A and 14H in FIG. 5.

Assuming each communication link such as links 12, 19, 21, and 61–73 shown in FIG. 5 has a 70% reliability, each communication link in the path between 14A and 14H individually lowers the probability that the message reaches the destination node. For example, using communication links with 70% reliability, the probability of the message reaching node 14H from node 14A along the path indicated by the arrows is $0.7^4 = 0.24$ or 24%. After receiving the message from node 14A, node 14H must in some way acknowledge the message. Node 14H's acknowledgment also only has a 24% probability of reaching node 14A following the reverse path indicated by the arrows in FIG. 6. Thus the overall probability of node 14A transmitting a message to node 14H and properly receiving node 14H's response is $0.7^8 = 0.058$ or 5.8%.

In a communication system such as shown in FIG. 5, the improved technique for acknowledging packets of the present invention is well suited for implementation on the link level. The link level thus assures substantially 100% probability that the message is received between two adjacent nodes such that the transport level and the high level may be configured as if the link level is substantially 100% reliable.

For each node with which a node in a communication system will be exchanging message packets such as 36A or 36B, separate receive counters 30, transmit counters 32 and status information for previously received messages must be stored in the memory array 26 shown in node 14A of FIG. 1. For example, in the communication system FIG. 5 each node 14A, 14B, 14C, etc. would exchange message packets like 36A and 36B with only the directly connected nodes if the protocol of the present invention were implemented on the link level. Thus node 14D, 14G in system 60 of FIG. 5 would each require four receive counters 30 and four transmit counters 32. Each node 14A, 14B, 14C, etc. would also be required to store the status of the eight previously received messages from each of the four adjacent nodes 14 in the memory 34 of memory array 26. Using additional computer memory and packets which contain address fields, the present invention may be implemented at a higher communication level such as the intermediary level.

This technique for acknowledging message packets ensures high speed communication between nodes in a communication system even when the communication links 12 in the system offer poor reliability. The technique reduces the number of duplicate message transmissions and decreases the amount of time spent waiting for time outs to occur.

Although the present invention is described with reference to preferred embodiments, workers skilled in the art will recognize that changes may be made in form and detail without departing from the spirit and scope of the invention. For example, although a system and method is described in which only three types of status for the eight previous messages is maintained, other numbers of messages could be used or protocol sections having more than three status types could be included in the message packets.

What is claimed is:

1. A method for acknowledging messages transmitted from a first node to a second node in a communication system having a plurality of nodes, the method comprising:

receiving, at the second node a plurality of received messages transmitted over the communication system from the first node;

generating at the second node an acknowledgement field comprising a plurality of discrete acknowledgment status elements representative of acknowledgment status of more than one of the plurality of received messages received at the second node from the first node, wherein each of the plurality of discrete acknowledgment status elements is representative of more than one acknowledgment status condition of an individual message received at the second node;

generating at the second node a busy status field comprising a plurality of discrete busy status elements representative of an occurrence of a busy status at the second node for more than one of the plurality of received messages received at the second node from the first node, wherein each of the plurality of discrete busy status elements is representative of more than one busy status condition during receipt of an individual message at the second node; and sending reply messages from the second node over the communication system to the first node, each reply message including the acknowledgement field representing the individual and discrete acknowledgment status of a plurality of messages sent to the second node from the first node and the busy status field representing the individual and discrete busy status of a plurality of messages sent to the second node from the first node.

2. The method of claim 1 including the step of sending a status inquiry message to the second node from the first node if a time-out period expires during which no reply message from the second node is received by the first node.

3. The method of claim 1 including generating a busy status field representative of a busy status if the second node is busy when a message from the first node is received at the second node and sending the busy status field to the first node with the reply messages.

4. The method of claim 1 wherein after the second node receives a message from the first node, the second node sends a reply message to the first node.

5. The method of claim 1 wherein messages sent by the first node to the second node include data representing the individual status of a plurality of reply messages sent from the second node to the first node.

6. The method of claim 5 including the step of resending selected messages from the first node to the second node based upon data contained in the acknowledgement field of reply messages received by the first node from the second node.

7. The method of claim 1 wherein messages sent by the first node each include a unique sequence number representing the order of that message within a sequence of messages.

8. The method of claim 7 wherein reply messages transmitted by the second node include the sequence number of the last message received from the first node.

9. An apparatus in a communication system having a plurality of nodes for acknowledging messages sent from a first node to a second node over the communication system, first and second nodes each having means for transmitting messages and means for receiving messages on the communication system, the improvement comprising:

means for storing at the second node, as a function of a plurality of messages received by the second node, individual and discrete acknowledgment and busy status information for a plurality of messages sent to the second node from the first node;

means for generating at the second node an acknowledgement field comprising a plurality of discrete acknowledgment status elements representative of acknowledgment status of more than one of the plurality of messages received by the second node, wherein each of the plurality of discrete acknowledgment status elements is representative of more than one status condition of an individual message received by the second node;

means for generating at the second node a busy status field comprising a plurality of discrete busy status elements representative of a busy status of more than one of the plurality of messages received by the second node, wherein each of the plurality of discrete status elements is representative of more than one busy status condition at the second node during receipt of a message; and means at the second node for causing the means for transmitting messages at the second node to transmit to the first node a reply message including the acknowledgement field which comprises data derived from the means for storing representing individual acknowledgment status of a plurality of messages sent to the second node from the first node and the busy status field which comprises data derived from the means for storing representing the individual busy status of the second node during receipt at the second node of a plurality of messages sent to the second node from the first node.

10. The apparatus of claim 9 wherein the second node sends a reply message in response to receiving a message from the first node.

11. The apparatus of claim 9 wherein messages sent by the first node each include a sequence number representing the order of that message within a sequence of messages.

12. The apparatus of claim 11 wherein each reply message sent by the second node to the first node further includes the sequence number of the last message received by the second node from the first node.

13. The apparatus of claim 9 wherein messages sent from the first node to the second node each include status information representing the individual status of a plurality of reply messages sent to the first node from the second node.

14. The apparatus of claim 13 including means for retransmitting selected messages from the first node to the second node based upon data contained in the acknowledgement field in reply messages received by the first node from the second node.

15. The apparatus of claim 13 including means for transmitting a status inquiry message from the first node to the second node after a time-out period expires during which no reply message is received by the first node.

16. An apparatus for acknowledging messages sent from a first node to a second node over a communication system having a plurality of nodes, the apparatus comprising:

means for receiving, at the second node a plurality of messages transmitted over the communication system from the first node;

means for storing, at the second node, the individual and discrete status of the plurality of messages transmitted from the first node to the second node;

means for generating at the second node an acknowledgement field comprising a plurality of discrete acknowledgment status elements representative of acknowledgment status of more than one of the plurality of messages received by the second node, wherein each of the plurality of discrete acknowledgment status elements is representative of more than one acknowledgment status condition of an individual message received by the second node;

means for generating at the second node a busy status field comprising a plurality of discrete status elements representative of busy status at the second node of more than one of the plurality of messages received by the second node, wherein each of the plurality of discrete status elements is representative of more than one busy status condition at the second node during receipt of a message; and means, at the second node, for sending reply messages from the second node to the first node including the acknowledgement field which represents individual acknowledgment status of a plurality of messages previously transmitted from the first node to the second node and the busy status field which represents a plurality of busy status conditions at the second which represents busy status of a plurality of messages previously transmitted from the first node to the second node, wherein the means for sending reply messages transmits a reply message to the first node in response to the means for receiving messages having received a message from the first node.

17. The apparatus of claim 16 including means, at the first node, for transmitting a status inquiry message from the first node to the second node after a time-out period expires during which no reply message sent from the second node is received by the first node.

18. The apparatus of claim 10 wherein each message transmitted by the first node includes a sequence number representing the order of that message within a sequence of messages.

19. The apparatus of claim 18 wherein reply messages transmitted from the second node to the first node include the sequence number of the last message received by the second node from the first node.

20. The apparatus of claim 11 wherein each message sent from the first node to the second node includes status information representing the individual status of a plurality of reply messages transmitted from the second node to the first node.

21. The apparatus of claim 20 including means, at the first node, for retransmitting selected messages sent from the first node to the second node based upon data contained in the acknowledgement field of reply messages received by the first node from the second node.

* * * * *